April 8, 1930. F. A. ANDERSON 1,754,006
SUPPORT
Filed Aug. 8, 1925 3 Sheets-Sheet 1

Inventor:
Fritz A. Anderson
By Williams, Bradbury, McCaleb & Hinkle
Attys.

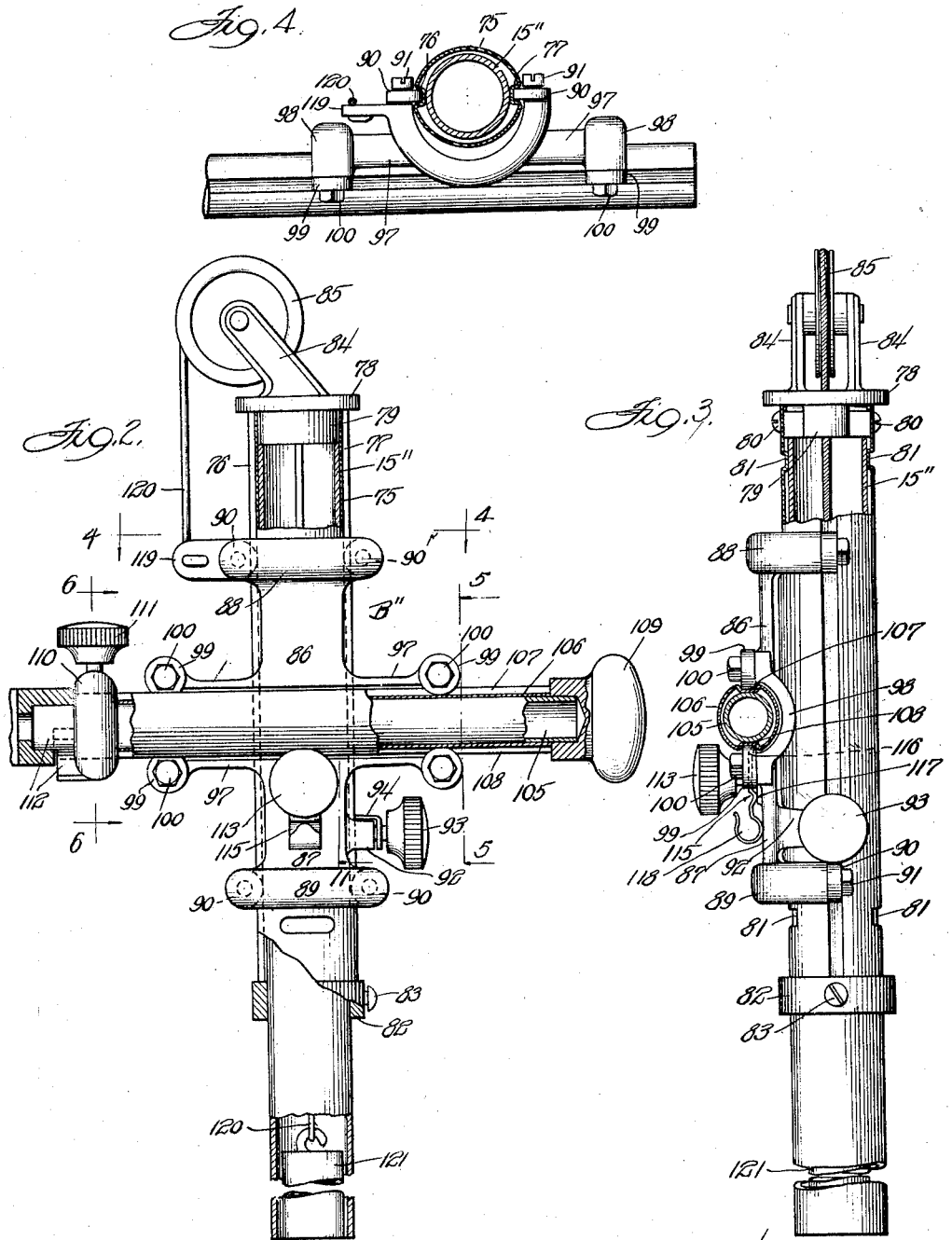

April 8, 1930.　　　F. A. ANDERSON　　　1,754,006
SUPPORT
Filed Aug. 8, 1925　　　3 Sheets-Sheet 3
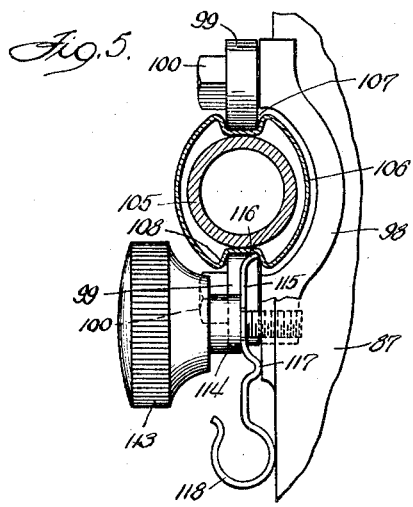
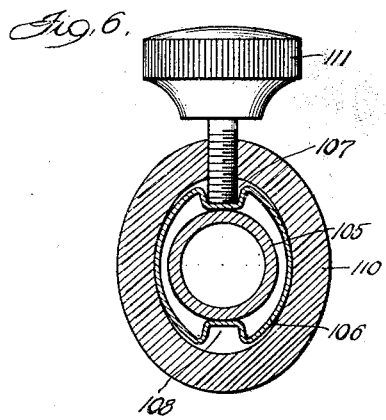
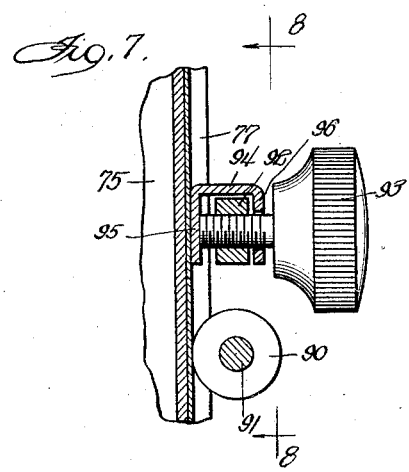
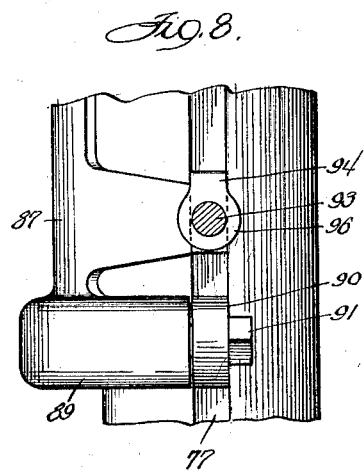
Inventor:
FRITZ A. ANDERSON Patented Apr. 8, 1930

1,754,006

UNITED STATES PATENT OFFICE

FRITZ A. ANDERSON, OF MILTON, WISCONSIN, ASSIGNOR TO THE BURDICK CORPORATION, OF MILTON, WISCONSIN, A CORPORATION OF DELAWARE

SUPPORT

Application filed August 8, 1925. Serial No. 49,060.

This invention relates to supports. It will be explained as embodied in floor stands particularly adapted for carrying therapeutic lamps.

Among the objects of the invention is the provision of an improved support.

Another object is to provide a support that is reliable, strong and easy to manipulate.

Another object is to provide a support that can be manipulated without injury to any of its parts.

Another object is to provide a support having a more pleasing appearance than supports heretofore in use.

Another object is to provide a support wherein the movable elements thereof can be locked in an immovable position without marring the finish of the member to which they are clamped.

Another object is to provide a support that can be made almost entirely of stamped metal.

Other objects and advantages will hereafter appear.

In the drawings:

Fig. 2 is an enlarged view of a portion of the mechanism shown in Fig. 1,

Fig. 3 is an end elevation thereof,

Fig. 4 is a section on the line 4—4 of Fig. 2,

Fig. 5 is an enlarged section on the line 5—5 of Fig. 2,

Fig. 6, is an enlarged section on the line 6—6 of Fig. 2,

Fig. 7 is an enlarged detail view of the lock for holding the carrying bracket in any vertical position on its standard, and Fig. 8 is a section on the line 8—8 of Fig. 7.

Figure 1:
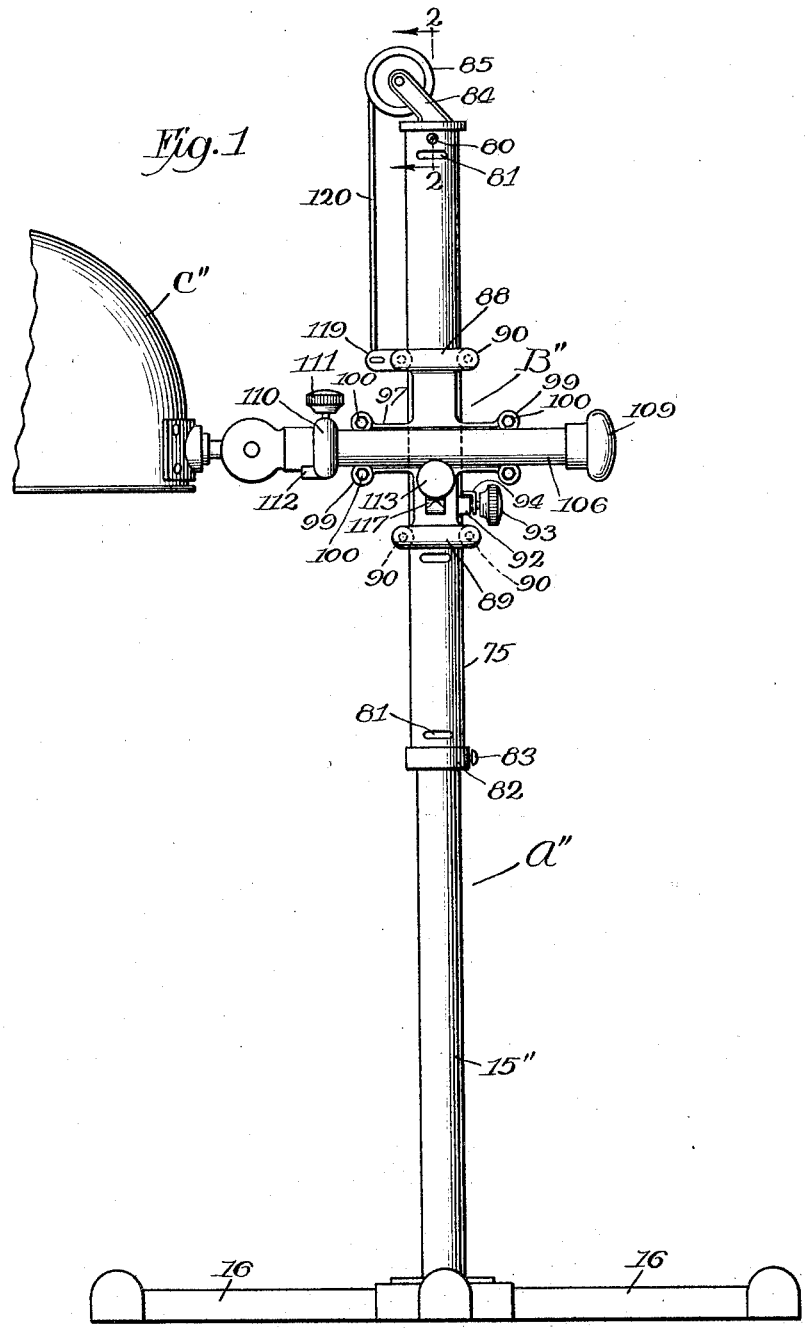
Fig. 1 is a side elevational view of my improved support.

The support comprises in general a standard A'' and a movable carrying bracket B'' supported thereby. The bracket may be adapted to carry various appliances, such as therapeutic lamps and other instruments and objects. In Fig. 1 it is illustrated with a therapeutic lamp C'' (partly shown) secured thereto. The standard includes a tubular metal post 15'' to the bottom of which suitable feet 16 are attached in any desirable manner.

The bracket carrying frame B'' includes a relatively thin metal envelope in the form of a tube 75 which is somewhat elliptical in cross section, as shown most clearly in Fig. 4. Envelope 75 loosely encircles post 15'' and is formed to provide a pair of channels or guide-ways 76 and 77 extending longitudinally thereof. A cap 78 rests on top of post 15'', ball bearings being interposed therebetween if desired. To the base 79 of this cap the envelope 75 is secured by suitable means such as screws 80. An anti-friction bearing may be interposed, if desired, between the bottom of cap 78 and the top of the tubular standard 15''.

The length of envelope 75 and its guideways 76 and 77 should be at least equal to the desired up and down movements of the bracket. If desired envelope 75 may have inwardly projecting beads 81 formed therein to touch the inner post 15'' and thus cooperate with the bottom walls of guideways 76—77 to prevent sidewise play therebetween. It will be apparent that envelope 75 is rotatably suspended from the cap 78 which rests on the top of the post so that the envelope may be turned about the post in an axially fixed position. If it is desired to provide for the anchoring of the envelope in any rotational position a collar 82, provided with a set screw 83 for engaging post 15'', may be secured thereto.

Cap 78 has a pair of parallel upstanding arms 84 between and to which a cable pulley 85 is rotatably mounted. This cable pulley is rigidly carried by the bracket-carrying frame so as to be positively moved therewith.

The bracket B'' of this type of support includes a substantially cross shaped body which may be made of a metal casting or metal stamping. The vertical arms 86 and 87 of the bracket body are provided or formed respectively with substantially semi-circular yokes 88 and 89 which partly encircle but do not touch envelope 75. Yokes 88 and 89 have rollers 90 rotatably secured to their opposite ends by screws 91. These rollers lie in pairs in the grooves or guideways 76 and 77 of envelope 75. Thus the bracket may be moved up and down relatively to the axially fixed envelope.

Yoke 87 has a lug or arm 92 projecting laterally therefrom. A threaded hole for receiving a knurled headed adjusting screw 93 is provided in the end of lug 92 directly opposite the groove 77 in envelope 75. A U-shaped friction stirrup 94 is positioned about the extremity of lug 92 with one of its legs 95 lying in groove 77 and in a position to be engaged by the inner end of screw 93. The other leg 96 of stirrup 94 is provided with a hole through which screw 93 loosely passes. Thus when it is desired to lock the bracket in any desired vertical position screw 93 is turned to force its end against leg 95 of stirrup 94 and the stirrup is moved inwardly against the bottom wall of groove 77. If envelope 75 is sufficiently flexible the turning in of screw 93 may cause the stirrup to force the bottom wall of guideway 77 against post 15″ and thus even anchor the bracket and its carrying frame against rotation. Reverse rotation of screw 93 moves the same outwardly, loosening the grip of the stirrup and thus permitting the bracket to be freely moved up and down upon the carrying frame envelope.

The body of the bracket has horizontally extending arms 97 whose outer ends are provided with or formed into substantially semi-circular yokes 98. Rollers 99 are rotatably secured to the four ends of yokes 98 by screws 100. These rollers slidably support an adjustable appliance-carrying arm as will now be explained.

The appliance-carrying arm comprises an inner relatively rigid metal tube 105 of circular cross section enclosed by a relatively thin metal envelope 106 of substantially elliptical cross section. Opposite sides of the envelope 106 are bent inwardly to form a pair of longitudinal grooves or guideways 107 and 108 for the upper and lower rollers 99 respectively, as shown most clearly in Figs. 3, 5 and 6. A knob 109 is rigidly attached to the rear end of tube 105 to serve as a convenient handle for manipulating the bracket and the rear end of envelope 106 fits tightly thereagainst. The forward end of the arm has an appliance attachment element 110 which may serve as a part of a hinge connection between the appliance, such as a therapeutic lamp, and the support. This element 110 is rigidly secured to envelope 106 by spot welding or other suitable means. Since knob 109 is rigidly secured to tube 105 and abuts the rear ends of envelope 106 and envelope 106 is rigidly secured to attachment element 110 there can be no relative axial movement between the tube 105 and its envelope. However, the tube may be rotated within the envelope so as to turn the appliance carried thereby. Thus tube 105 and its envelope may be moved together transversely of the standard between rollers 99 and the tube may be rotated within its envelope. A hand set screw 111 which threads through element 110 with its inner end in groove 107 may be turned so as to force the bottom wall of groove 107 against tube 105, as most clearly shown in Fig. 6, and thereby lock the tube and its envelope against relative rotation. Element 110 may be formed and made hollow to provide a duct 112 for electrical conductors which may be carried through the hinge to an electrical appliance in the usual manner.

Provision is made for locking the appliance-carrying arm in any desired laterally adjusted position. A hand set screw 113 threads into the body of the bracket and is provided with a shoulder piece 114 as most clearly shown in Fig. 5. This screw passes loosely through a spring metal friction clip 115 which has a curved finger 116 adapted to bear against one side wall of groove 108. Clip 115 is bent to form a fulcrum 117 which rests against the body of the bracket. When screw 113 is threaded inwardly its shoulder piece 114 engages clip 115 and, rotating the same about fulcrum 117, forces the finger 116 against the wall of the groove. In this manner the transverse arm is held laterally stationary against accidental displacement. The lower end of clip 115 may be formed into a hook for receiving and holding an electrical conductor cord.

In order to counter-balance the bracket and the appliance carried thereby yoke 88 is provided with an extension 119 to which a cord 120 may be attached. Cord 120 passes over pulley 85 and through a hole in cap 78 to the inside of post 15″ where its other end is secured to a counterweight 121.

The manner in which this type of support functions should be clear from the preceding description thereof.

In manipulating the support the lamp may be raised and lowered and rotated and its carrying arm moved in and out and rotated properly to position the lamp or other appliance carried thereby. In the up and down movements the bracket moves relatively to the enveloping tube while the standard and tube are relatively axially fixed. These movements are rendered easy because of the presence of the anti-friction rollers between the bracket and the tube and the counterweight. In the rotary movements of the bracket about the standard the tube and bracket move together about the standard because of the cooperation between the grooves and rollers,—there being no relative rotation between the tube and the bracket. During such operation about the standard the pulley at the top thereof, because of the rigid connection between its bracket and the enveloping tube, is positively rotated with the bracket insuring that the rotational movements of the bracket may be made without interference and effort. The cable will not be wrapped around the post or standard no matter how much the bracket may be turned thereabout and, since the bracket does not touch the post or standard, while the tube which does touch the post is axially immovable relative thereto, there is no tendency to mar the post. The transverse movements of the appliance-carrying arm of the bracket are made easy by the anti-friction rollers associated therewith and the appliance may be temporarily clamped in any adjusted position.

Having thus illustrated and described embodiments of my invention, what I claim and desire to secure by United States Letters Patent is:

1. In a support the combination of a standard, a bracket-carrying frame including a grooved envelope encircling the standard and a cap on the standard for suspending the envelope therefrom in an axially fixed position, a bracket carried by the frame, and means between the bracket and frame for permitting the bracket to move axially upon the frame and for causing the frame to rotate with the bracket.

2. A support comprising a tubular standard, a cap rotatably mounted on the standard, a cable pulley carried by the cap, a bracket-carrying frame in the form of a grooved tubular envelope carried by the cap in an axially fixed position on the standard and rotatable about the standard, a bracket, rollers carried by the bracket and located in the grooves of the frame whereby the bracket may be moved along the frame and rotated about the standard with the frame, a counterweight movably mounted within the standard, and a cable interconnecting the bracket and counterweight and trained about the pulley.

3. A support comprising a standard; a grooved envelope encircling the standard and mounted to be rotatable thereabout in a fixed axial position; and a bracket having rollers which fit in the grooves of the envelope so that the bracket may be moved axially along the envelope and rotatably about the standard with the envelope, and having a carrying arm, supported in a transversely adjustable position.

4. In combination a standard, a grooved envelope encircling the standard and rotatably suspended thereabout in an axially fixed position, a bracket body, rollers carried by the bracket body and located in the groove whereby the body and envelope may be moved relatively to each other in an axial direction and together around the standard, and a supporting transverse arm adjustably carried by the bracket body.

5. In a support the combination of a standard, an enveloping tube supported from the standard in an axially fixed rotatable position, and a bracket supported by the enveloping tube in an axially movable and rotatably fixed relation thereto.

6. In a support the combination of a standard, an enveloping tube supported from the standard in an axially fixed rotatable position, a bracket supported by the enveloping tube in a axially movable and rotatably fixed relation, a pulley connected to the eneveloping tube so as to be turned therewith, a counterweight for the bracket and a cable connected to the bracket and counterweight and passing over the pulley.

7. In a support the combination of a standard, an enveloping tube supported on the standard in an axially fixed rotatable relation, a bracket carried by the enveloping tube in an axially movable and rotatably fixed relation, and means for holding the bracket in any axial position relative to the enveloping tube.

8. A support comprising a standard, an enveloping tube supported thereby in a rotatable axially stationary position, a bracket associated with the enveloping tube in an axially movable rotatably fixed relation; an arm carried by the bracket in a transversely adjustable relation; and means for holding the bracket and arm in any adjusted position.

9. A support comprising a tubular standard, a tubular envelope rotatably carried by the standard in a fixed axial position and formed to provide a pair of longitudinally extending grooves, a bracket having rollers positioned in said grooves whereby the bracket may be moved axially along the envelope but rotation of the bracket rotates the envelope, and means for attaching an appliance to the bracket.

10. In a support a hollow standard, a grooved envelope surrounding the standard and rotatably suspended from the top thereof, a pulley secured to the top of the envelope rotatable therewith, a bracket slidable vertically with respect to the envelope and guided thereon by the groove therein, a counterweight in the standard, a cable having its ends secured to the bracket and counterweight and passing over the pulley and means for depressing a portion of the envelope against the standards for the purpose described.

11. In a support the combination of a standard, a bracket on the standard adapted to be moved relatively thereto, a supporting arm carried by the bracket, the supporting arm including a tubular member having its axis transverse to the axis of the standard, and the arm adapted to have rotative movement about said axis and longitudinal movement with respect thereto and means associated with the bracket for depressing the wall of the tubular member into engagement with the arm to prevent both longitudinal and rotative movement of the arm with respect to the tubular member.

12. In a support the combination of a standard, a bracket on the standard adapted to be moved relatively thereto, rollers on the bracket, and an article carrying arm supported by the rollers, the supporting arm comprising a metal tube, a grooved envelope surrounding the tube, the rollers on the bracket riding in the grooves, the tube being rotatable on its axis within the envelope, and the tube and axis together movable longitudinally of the axis of the tube, means being provided for engaging the envelope to prevent said longitudinal movement of the tube and envelope, and for depressing the wall of the envelope against the tube to prevent axial rotation of such tube.

13. In a support the combination of an upright standard, an enveloping tube supported from the standard in an axially fixed rotatable position, said tube having longitudinally extending groove therein, a bracket supported by the enveloping tube and axially movable thereon, a roller carried by the bracket and located in said groove of the enveloping tube to prevent rotation between the bracket and tube, a pulley connected to the enveloping tube so as to be turned therewith, a counter weight for the bracket, and a cable interconnecting the counter weight and the bracket and passing over the pulley.

14. In a lamp support the combination of an upright standard, a cap rotatably mounted on the top of the standard and carrying a cable pulley, an enveloping tube for a portion of the standard, said tube being carried by the cap in an axially fixed but rotatable relation to the standard and having a longitudinal groove therein, a lamp supporting bracket carried by the tube, a plurality of rollers interposed between the bracket and the tube to facilitate movement of the bracket along the tube longitudinally of the standard, one of said rollers being in the groove of the tube to prevent rotation between the bracket and the tube, a counterweight for the bracket, and a cable passing over the pulley and connecting the bracket to the counterweight.

In witness whereof, I hereunto subscribe my name this 5th day of August, 1925.

FRITZ A. ANDERSON.